(12) United States Patent
Gozum et al.

(10) Patent No.: US 6,964,509 B2
(45) Date of Patent: Nov. 15, 2005

(54) TASK LIGHTING SYSTEM

(75) Inventors: John E. Gozum, Stillwater, MN (US); Thomas J. Reid, White Bear Lake, MN (US); Duane C. Richardson, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 20 days.

(21) Appl. No.: 10/738,428

(22) Filed: Dec. 16, 2003

(65) Prior Publication Data

US 2005/0128769 A1 Jun. 16, 2005

(51) Int. Cl.⁷ .............................................. F21V 21/00
(52) U.S. Cl. ....................... 362/581; 362/551; 242/380; 242/385.1
(58) Field of Search .............................. 362/551, 576, 362/581; 254/334, 375, 383; 242/380, 385.1

(56) References Cited

U.S. PATENT DOCUMENTS

| | | | |
|---|---|---|---|
| 3,327,712 A | 6/1967 | Kaufman et al. | |
| 3,582,638 A | 6/1971 | Peters | |
| 3,638,013 A | 1/1972 | Keller | |
| 3,922,063 A | 11/1975 | Marrone | |
| 4,389,645 A | 6/1983 | Wharton | |
| 5,022,600 A | 6/1991 | Blanc et al. | |
| 5,186,406 A | 2/1993 | Romanelli | |
| 5,602,948 A | 2/1997 | Currie | |
| 5,631,994 A | 5/1997 | Appeldorn et al. | |
| 5,645,147 A | 7/1997 | Kovacik et al. | |
| 5,746,495 A | 5/1998 | Klamm et al. | |
| 5,845,038 A | 12/1998 | Lundin et al. | |
| 5,915,062 A | 6/1999 | Jackson et al. | |
| 6,193,387 B1 * | 2/2001 | Schlichting | 362/109 |
| 6,215,947 B1 | 4/2001 | Abramowicz et al. | |
| 6,259,855 B1 | 7/2001 | Lundin | |
| 6,267,492 B1 | 7/2001 | Reid et al. | |
| 6,367,941 B2 | 4/2002 | Lea et al. | |
| 6,450,677 B1 | 9/2002 | Knauer et al. | |
| 6,535,667 B1 | 3/2003 | Gozum et al. | |
| 6,580,449 B1 * | 6/2003 | Meltzer | 348/85 |
| 6,612,729 B1 | 9/2003 | Hoffman | |
| 2004/0032741 A1 * | 2/2004 | Tai | |

FOREIGN PATENT DOCUMENTS

| | | |
|---|---|---|
| EP | 0 528 501 | 2/1993 |
| GB | 2 312 526 | 10/1997 |

OTHER PUBLICATIONS

Service Guide 7234-B, 7235-B, for Heavy-Duty Hose Reels, Copyright© 1997 by Alemite Corporation.

\* cited by examiner

Primary Examiner—Laura K. Tso
(74) Attorney, Agent, or Firm—William L. Huebsch

(57) ABSTRACT

A task light assembly including a long flexible fiber optic element capable of transmitting light between light inlet and light outlet ends; a light source at the light inlet end of the fiber optic element; and a reel assembly for supporting the light source and the light inlet end of the fiber optic element and for allowing movement of the fiber optic element between a storage position with the light outlet end of the fiber optic element supported in a storage position, and an extended use position with the light outlet end of the fiber optic element at a work location remote from the storage position.

10 Claims, 4 Drawing Sheets

TASK LIGHTING SYSTEM

FIELD OF THE INVENTION

This invention relates to sources of light (called task lights herein) that can be easily moved to illuminate a work area.

BACKGROUND OF THE INVENTION

When ambient lighting at a work area (e.g., the underside or motor compartment of an automobile) is insufficient, that work area can be illuminated with a task light. Commonly used task lights include portable light fixtures (sometimes called "trouble lights") powered from an electrical distribution system that include incandescent bulbs or fluorescent tubes, and flashlights. Incandescent bulbs can provide a directed source of light, but become hot during use so that they can burn thermally sensitive materials or the user of the task light. Also, the filaments in such bulbs can be broken from even a slight impact. Fluorescent tubes generate less heat and are more impact resistant than incandescent bulbs, however the light they produce is more diffuse and not as well directed to a work area. Flashlights provide a directed source of light, but require frequent replacement or recharging of their batteries. Unless specially designed, all of these task lights can be a source of ignition for flammable vapors in the work area.

DISCLOSURE OF THE INVENTION

The present invention provides a task light that provides a directed source of light, does not become hot during use, will not be disabled by impact, and is not a source of ignition for flammable vapors in the work area.

According to the present invention there is provided a task light assembly comprising a long flexible fiber optic element capable of transmitting light between its first and second ends; a light source at the first or light inlet end of the fiber optic element; and means for supporting the light source and the light inlet end of the fiber optic element and for allowing movement of the fiber optic element between a storage position with the second or light outlet end of the fiber optic element supported in a storage position, and an extended use position with the light outlet end of the fiber optic element at a work location remote from the storage position.

The means for supporting the light source and the light inlet end of the fiber optic element and for allowing movement of the fiber optic element between its storage and use positions is provided by a reel assembly. The reel assembly includes a hub, means for supporting the hub on a support member, and a reel mounted for rotation on the hub. The light source and the light inlet end of the fiber optic element are mounted on the reel assembly, and over 80 percent of the length of the fiber optic element is coiled around a generally cylindrical peripheral surface of the hub in the storage position. That generally cylindrical peripheral surface of the hub should have a diameter of at least 12 inches or 30.5 cm and preferably of at least 18 inches or 45.7 cm to restrict curvature of the fiber optic element when it is wrapped around the peripheral surface of the reel, thereby restricting sharp bends in the element that could cause light leakage, and could possibly break the fiber optic element. The reel assembly includes (1) means for biasing the reel for rotation in a first direction during which rotation the fiber optic element can be wound around the peripheral surface of the reel; (2) means for allowing rotation of the reel in a second direction to unwind the fiber optic element from around the peripheral surface of the reel against the means for biasing; and (3) releasable retaining means between the hub and the reel for releasably retaining the reel at one of a plurality of locations with respect to the hub in opposition to the means for biasing, which releasable retaining means is engageable and releasable by applying and releasing tension along the fiber optic element.

The hub can be mounted on a support member that, for example, can be at an elevated location in an automobile repair facility. A workman in that facility can pull the fiber optic element from around the reel to the extent needed to bring its light outlet end to a work location that can be illuminated by light from the light source radiating from the light outlet end of the fiber optic element. Such illumination will be provided without placing a source of ignition for flammable vapors at the work area being illuminated. The shape and size of the area being illuminated through the light outlet end of the fiber optic element can, if desired, be modified using light extraction devices or mechanisms such as those described in U.S. Pat. No. 5,631,994 (Appeldorn et al.); U.S. Pat. No. 5,845,038 (Lundin et al.); U.S. Pat. No. 6,259,855 (Lundin); U.S. Pat. No. 6,267,492 (Reid et al.); U.S. Pat. No. 6,367,941 (Lea et al.); U.S. Pat. No. 6,535,667 (Gozum et al.); and U.S. Pat. No. 6,612,729 (Hoffman).

The light source can be an incandescent or halogen light bulb and the means for supporting can support that light source and the light inlet end of the fiber optic element on the reel. To restrict breaking the filament in the bulb as the reel suddenly starts and stops rotating during unwinding and rewinding of the fiber optic element around the periphery of the reel, the light bulb can be of the type operated at a voltage of less than 48 volts and a power of at least 50 watts, or more (preferably at a voltage of 24 volts or less and a power of 250 watts or more), because the filaments in such light bulbs can withstand significantly greater impact without breaking than can ordinary light bulbs that operate at 110 volts.

BRIEF DESCRIPTION OF THE DRAWING

The present invention will be further described with reference to the accompanying drawings wherein like reference numerals refer to like or corresponding parts throughout the several views, and wherein.

DETAILED DESCRIPTION OF THE INVENTION

Figure 1:
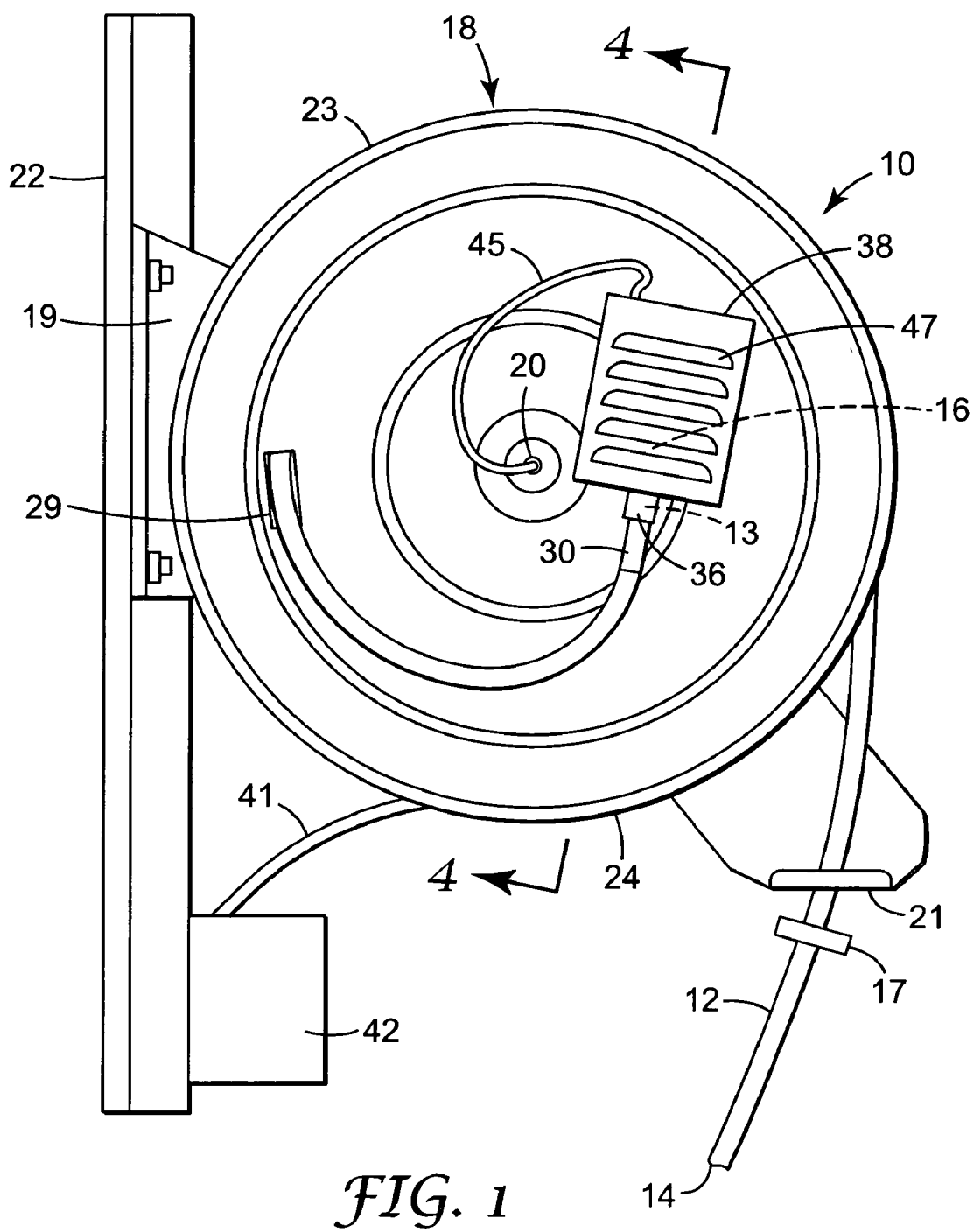
FIG. 1 is a perspective view of a first side of a task light assembly according to the present invention shown mounted on a support member.
Figure 2:
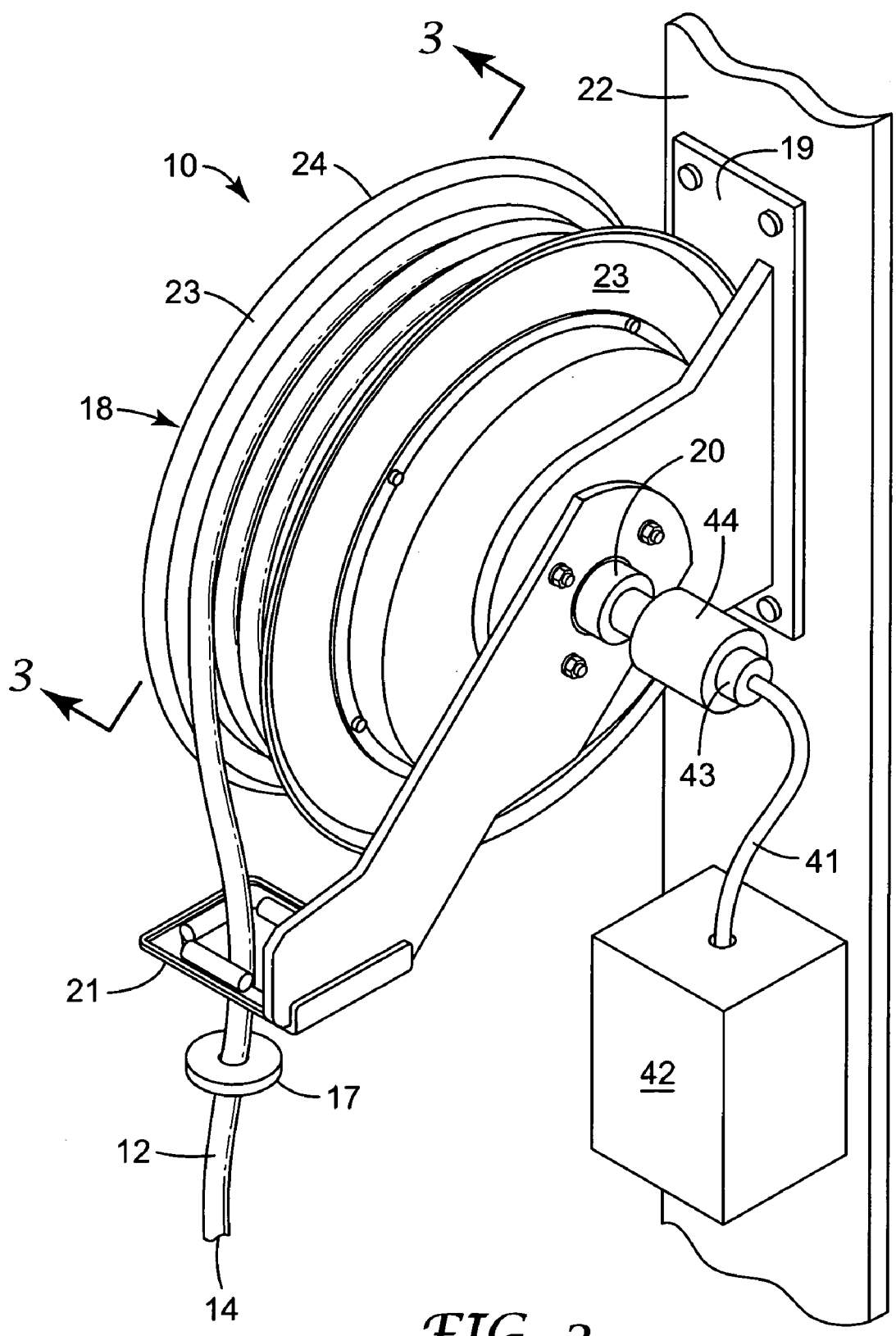
FIG. 2 is a perspective view of a second side opposite the first side of the task light assembly of FIG. 1 also shown mounted on the support member.

Referring now to the drawing there is illustrated a task light assembly according to the present invention generally designated by the reference numeral 10. Generally, the task light assembly 10 comprises a long elongate flexible fiber optic element 12 capable of transmitting light between its first (light inlet) and second (light outlet) ends 13 and 14; a light source 16 at the first or light inlet end 13 of the fiber optic element 12; and means for supporting the light source 16 and the light inlet end 13 of the fiber optic element 12 and
} for allowing movement of the fiber optic element 12 between a storage position with the second or light outlet end 14 of the fiber optic element 12 supported in a storage position, and an extended use position with the light outlet end 14 of the fiber optic element 12 at a work location remote from the storage position.

In the task light assembly 10, the means for supporting the light source 16 and the light inlet end 13 of the fiber optic element 12 and for allowing movement of the fiber optic element 12 between its storage and use positions comprises a reel assembly 18. The reel assembly 18 includes a hub 20 having an axially extending through opening, means in the form of a mounting bracket 19 for supporting the hub 20 on a support member 22, a reel 24 mounted for rotation on the hub 20, and a guide member 21 with a roller lined orifice through which the fiber optic element 12 extends for guiding the fiber optic element 12 off of or onto the reel 24. A stop member 17 that will not pass through the orifice of the guide member 21 is clamped around the fiber optic element 12 a short distance from its light outlet end 14. Contact between the stop member 17 and the guide member 21 defines the storage position of the fiber optic element 12 at which a short length of the fiber optic element 12 between its light outlet end 14 and the stop member 17 can be grasped by a user to withdraw the fiber optic element 12 from the reel 24.

Figure 3:
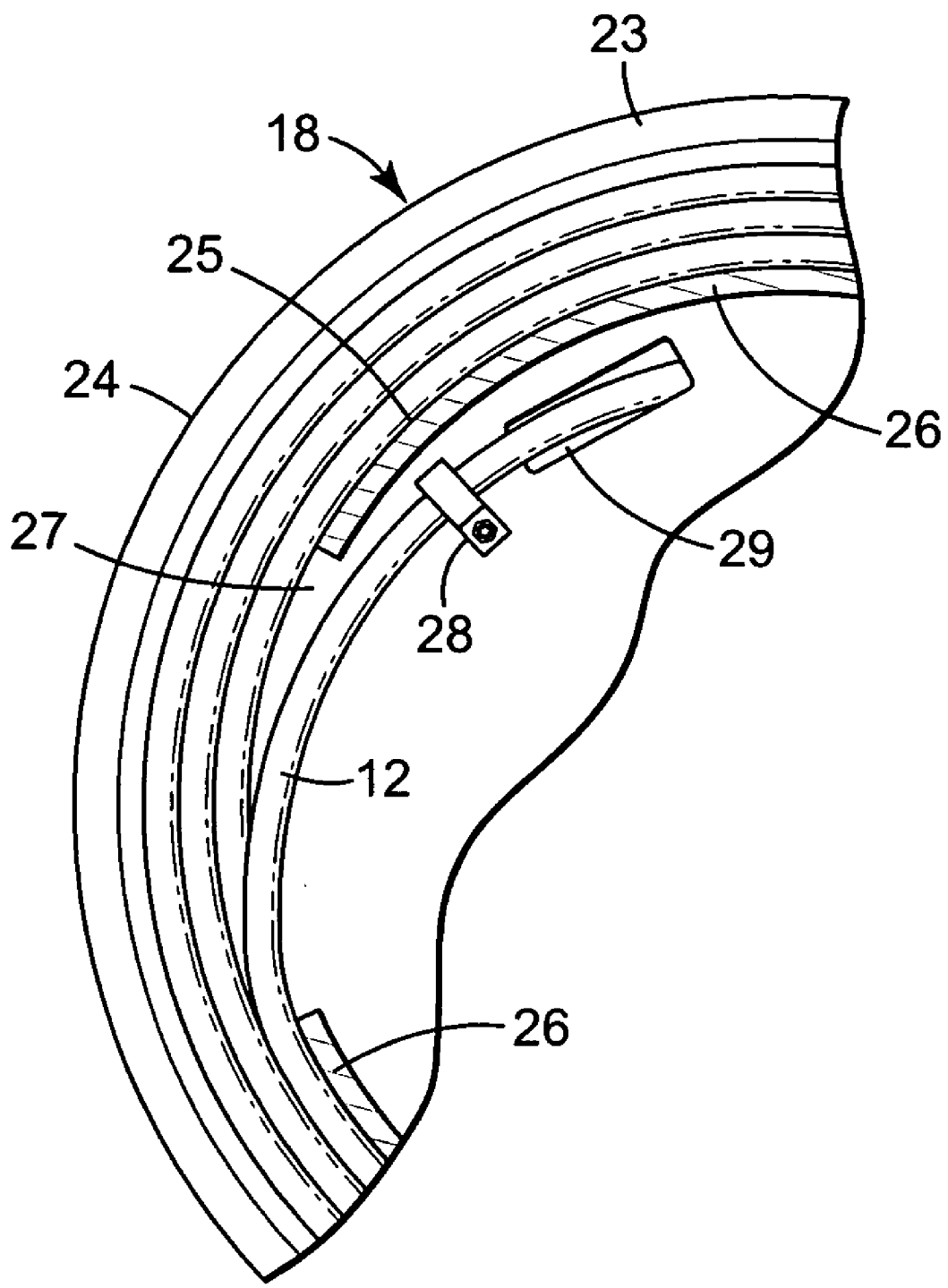
FIG. 3 is a fragmentary cross-sectional view taken approximately along line 3—3 of FIG. 2.

The light source 16 and the light inlet end 13 of the fiber optic element 12 are mounted on the reel 24. In the storage position of the fiber optic element 12 over 80 percent of the length of the element 12 is coiled around a generally cylindrical peripheral surface 25 of the reel 24 (see FIG. 3). Peripheral portions of circular side flanges 23 of the reel 24 project past the opposite sides of the peripheral surface 25. The peripheral surface 25 of the reel 24 has a diameter of at least 12 inches or 30.5 cm and preferably of at least 18 inches or 45.7 cm to provide a correspondingly large radius of curvature of the fiber optic element 12 when it is wrapped around the peripheral surface 25, thereby restricting sharp bends in the element 12 that could cause light leakage, and could possibly break the fiber optic element 12.

Figure 4:
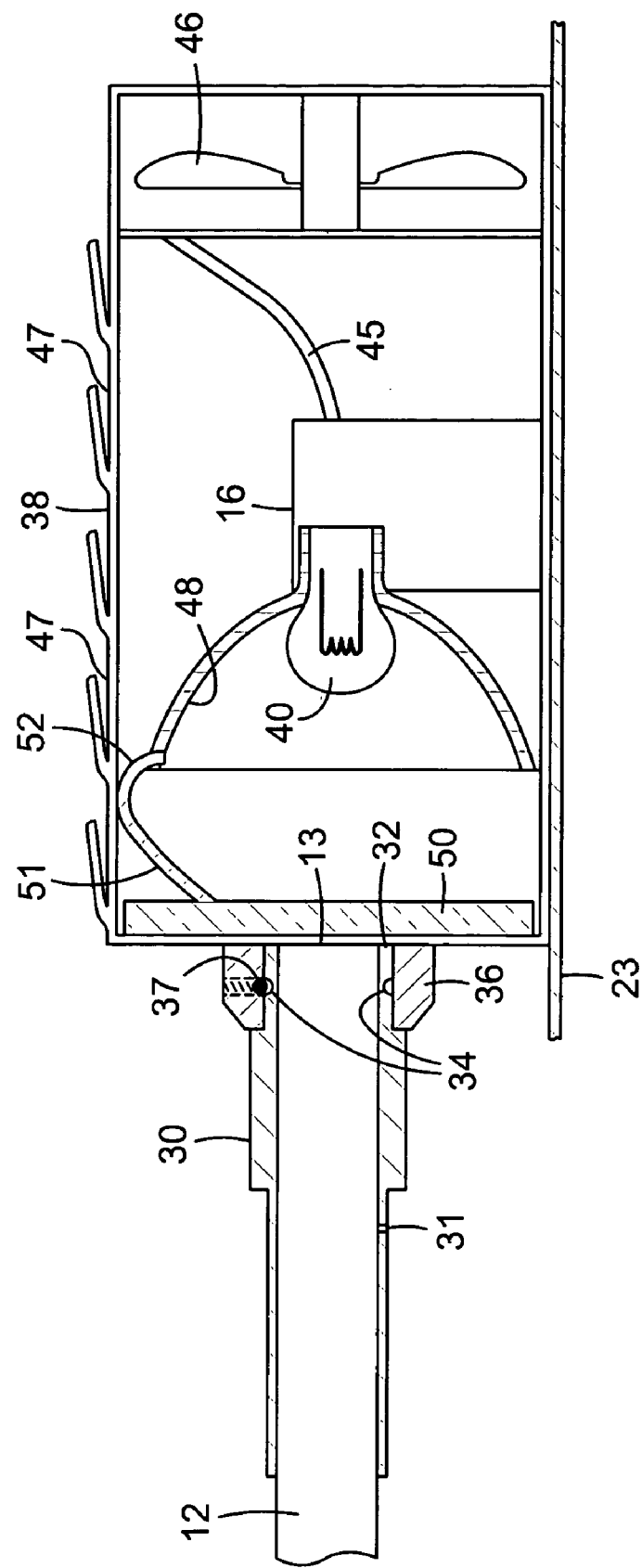
FIG. 4 is an enlarged fragmentary cross-sectional view taken approximately along line 4—4 of FIG. 1.

The reel assembly 18 includes (1) spring means between the hub 20 and reel 24 biasing the reel for rotation in a first direction (counter clockwise as viewed in FIG. 1) during which rotation the fiber optic element 12 can be wound around the peripheral surface 25 of the reel 24; (2) means for allowing rotation of the reel 24 in a second direction (clockwise as viewed in FIG. 1) to unwind the fiber optic element 12 from around the peripheral surface 25 of the reel 24 against the means for biasing; and (3) releasable retaining means between the hub 20 and the reel 24 for releasably retaining the reel 24 at one of a plurality of locations with respect to the hub 20 in opposition to the means for biasing, which releasable retaining means is engageable and releasable by applying and releasing tension along the fiber optic element 12. Such spring means, means for allowing rotation of the reel 24, and releasable retaining means are well known in the reel assembly art and are not described in detail herein. A suitable reel assembly 18 including those means can be made by modifying the "Heavy Duty Hose Reel", model 7235-B commercially available from Alemite Corporation, Charlotte, N.C., and described in a document titled "Service Guide", SER 7234-B, Revision (7-97) available from Alemite Corporation, the content of which document is incorporated herein by reference. Modifications of the "Heavy Duty Hose Reel, Model 7235-B for use in the present invention should include removing and discarding the Part No. 393539-99 "Swivel Assembly, Medium-Pressure", and changing or replacing its reel to provide the reel 24 that has the generally cylindrical peripheral surface 25 at least 12 inches or 30.5 cm and preferably at least 18 inches or 45.7 cm in diameter about which the fiber optic element 12 is wound. That surface 25 is formed by a cylindrical plate 26 extending between the flanges 23 of the reel 24 (see FIG. 3), which plate 26 has an opening 27 through which smoothly extends an end portion of the fiber optic element 12 adjacent its light inlet end 13 from the innermost wrap of the fiber optic element 12 about the cylindrical periphery 25. That end portion is attached to the inner surface of one of the flanges 23 by a padded hose clamp 28 and extends through an elongate slot 29 in that flange 23 to the outer surface of that flange 23. An elongate generally cylindrical metal sleeve 30 is fixed on that end portion by a set screw 31 (see FIG. 4) projecting inwardly of the sleeve 30, with an end 32 of the sleeve 30 aligned with the light inlet end 13 of the fiber optic element 12. The sleeve 30 has an annular recess 34 around its periphery spaced a short distance from its end 32. Part of the sleeve 30 adjacent its end 32 is adapted to be releasably engaged in a collar 36 fixed on the side of a housing 38 in which the light source 16 is contained. A spring loaded ball detent 37 is mounted in the collar 36 and will engage the annular recess 34 in the sleeve 30 when the sleeve 30 is engaged in the collar 36 at a predetermined location to releasably retain the sleeve 30 in the collar 36 with the light inlet end 13 of the fiber optic element 12 at a predetermined location with respect to the light source 16 in the housing 38.

The light source 16 in the housing 38 includes a halogen light bulb 40 which will move with the reel 24. To restrict breaking the filament in the light bulb 40 as the reel 24 suddenly starts and stops rotating during unwinding and rewinding of the fiber optic element 12 around the peripheral surface 25 of the reel 24, the light bulb 40 is of the type operated at a voltage of 48 volts or less (e.g., 48, 24 or 12 volts) and a power of at least 50 watts or greater (e.g., 150 to 250 watts) because the filaments in such light bulbs can withstand significantly greater impact without breaking than can ordinary light bulbs that operate at 110 volts. Electrical power at such voltage is supplied to the light bulb 40 from a conventional 110 volt power supply through a step down transformer or switching power supply 42. That power is connected to the bulb 40 through a slip ring assembly 43 including a first part fixed in a housing 44 mounted on one end of the hub 20 and a second part rotatable relative to that fixed part within the housing 44, one of which parts has electrical contacts biased against concentric annular slip rings in the other part so that electrical wires 41 extending between the step down transformer or switching power supply 42 and the first part fixed in the housing 44 will not rotate with the reel 24, while electrical wires 45 extending through the axially extending opening in the hub 20 between the rotatable part and the light bulb 40 will rotate with the reel 24. A suitable slip ring assembly 43 for this use is that commercially designated the "model 330" slip ring assembly which is available from Mercotac, Inc., Carlsbad, Calif. A cooling fan 46 for the light bulb 40 is mounted at one end of the housing 38 (e.g., the 24 volt cooling fan commercially designated "TYP 8500N" that is available from Papst Motoren, St. Georgen, Germany), and the housing 38 has a plurality of openings 47 that facilitate movement of air from the fan 46 around the light bulb 40. The light bulb 40 includes or is used with a reflector 48 that focuses light from the bulb 40 onto the light inlet end 13 of the fiber optic element 12 through a heat blocking and absorbing glass filter sheet 50 held and biased in place by a projection 51 of a bracket 52 that also receives and positions the reflector 48 and light bulb 40. As an example, the light bulb 40 and reflector 48 can be the 24 volt, 250 watt halogen bulb with an integrated reflector commercially available in the MR-16 size from Ushio America, Inc., Cypress, Calif. Such a halogen bulb 40 in the 150–250 watt range with its integrated reflector properly focused on the light inlet end 13 of the fiber optic element 12 (e.g., at about 5 cm from the bulb 40) can provide light output at the light outlet end 14 of the fiber optic element 12 that can surpass the light output from traditional task lighting systems.

The fiber optic element 12 can be made of a variety of different commercially available fiber optic materials. While the fiber optic element 12 could be formed from a plurality fibers, preferably the fiber optic element 12 is a single solid core fiber (e.g., of (meth)acrylic polymer) which has a greater ability to transport light per unit diameter than does a fiber optic element 12 formed from a plurality of fibers of the same material. As further described in U.S. Pat. No. 6,535,667, incorporated herein by reference, the fiber or fibers forming the fiber optic element 12 should have an outer cladding layer of a suitable polymeric material having a lower index of refraction than the material making up the core of the light fiber (e.g., fluorinated ethylene propylene, often abbreviated as FEP) to help retain light within the fiber or fibers, and the fiber or fibers can optionally have an outer layer or jacket (e.g., of a thermoplastic such as polyethylene or PVC) to protect the fiber or fibers and their claddings from abrasion during use of the fiber optic element 12. The fiber optic element 12 should have a diameter of between about 10 to 14 mm, and a length (e.g., at least about 15 feet or 4.5 meters such as about 50 feet or 15 meters) that is suitable to easily reach between the reel 24 and the work area in which the light is needed. A diameter of about 12 mm for the fiber optic element 12 is a good compromise between light carrying capacity and ease of handling. Material for a suitable fiber optic element 12 for use in the task light assembly 10 is commercially available from Poly Optics Australia Pty. Ltd., Burleigh, Australia.

Means can be provided at the light outlet end 14 of the fiber optic element for distributing light from the fiber optic element 12 in a predetermined pattern. For example, if a smaller diameter fiber optic element would be useful to provide light in a small space, or if two or more fiber optic elements would be useful to illuminate separate parts of a work location, that smaller diameter fiber optic member or those fiber optic elements can be attached to the light output end 14 of the fiber optic element 12 by means of a removable coupler adapted to hold together adjacent ends of the fiber optic element 12 and that element or those elements. Also, if it is desired to have light emitted radially from the one or more sides of a fiber optic element instead of or in addition to from the end of the fiber optic element 12, a specially engineered fiber optic element with extraction elements that afford such radially emitted light can be attached to the light outlet end 14 of the fiber optic element in the same manner. Also, any of a variety of other optical elements such as a lens for focusing light from the fiber optic element 12 can be attached to its light outlet end 14 in a similar manner, or the shape and size of the area being illuminated through the light outlet end 14 of the fiber optic element 12 can be modified using light extraction elements, devices, or mechanisms such as those described in U.S. Pat. No. 5,631,994 (Appeldorn et al.); U.S. Pat. No. 5,845,038 (Lundin et al.); U.S. Pat. No. 6,259,855 (Lundin); U.S. Pat. No. 6,267,492 (Reid et al.); U.S. Pat. No. 6,367,941 (Lea et al.); U.S. Pat. No. 6,535,667 (Gozum et al); and U.S. Pat. No. 6,612,729 (Hoffman), the contents of which U.S. Patents are incorporated herein by reference.

The hub 20 can be mounted on a support member such as the support member 22 that, for example, can be at an elevated location (e.g., more than 6 feet above the floor) in an automobile repair facility. A workman in that facility can pull the fiber optic element 12 from around the reel 24 to the extent needed to bring its light outlet end 14 to a work location that is to be illuminated by light from the light source 16 radiating from the light outlet end 14 of the fiber optic element 12. Such illumination will be provided without placing a source of ignition for flammable vapors at the work area being illuminated.

The present invention has now been described with reference to one embodiment. It will be apparent to those skilled in the art that many changes can be made in the embodiment described without departing from the scope of the present invention. For example, two or more separate fiber optic elements could be wrapped around the reel each receiving light from the same or separate light sources which, for example, might be useful in conditions where light is usually needed at two or more spaced work locations. Also, the light source could be mounted on the hub of the reel, which would allow the use of a light source including a conventional 110 volt light bulb, and a rotary coupling could then be provided between a small portion of the fiber optic element on the hub and a major portion of the fiber optic element around and or extending from the reel. Also, the light source could include a light emitting diode or an electron discharge device instead of an incandescent or halogen light bulb; or the light bulb used could be a metal halide type rather than a halogen type. Such metal halide light bulbs produce a more white light with less heat than do halogen bulbs, however the cost of metal halide light bulbs and of their associated electronics makes them less cost effective than halogen systems. Thus, the scope of the present invention should not be limited to the structures and methods described in this application, but only by the structures and methods described by the language of the claims and the equivalents thereof.

What is claimed is:

1. A task light assembly comprising:
    a long elongate flexible fiber optic element having opposite light inlet and light outlet ends;
    a light source at the light inlet end of said fiber optic element; and
    means for supporting said light source and said light inlet end of said fiber optic element and for allowing movement of said fiber optic element between a storage position with the light outlet end of said fiber optic element supported in a storage position, and an extended use position with the light outlet end of said fiber optic element at a work location remote from said storage position,
    said means for supporting said light source and said light inlet end of said fiber optic element and for allowing movement of said fiber optic element between said storage and use positions comprising a reel assembly, said reel assembly;
        including a hub, means for supporting said hub on a support member, and a reel rotateably mounted on said hub, said reel having a generally cylindrical periphery with a diameter of at least 12 inches or 30.5 cm, said light source and said light inlet end of said fiber optic element being mounted on said reel assembly, over 80 percent of the length of said fiber optic element being coiled around the periphery of said reel in said storage position, and said reel assembly including
(1) means for biasing said reel for rotation in a first direction during which rotation said fiber optic element can be wound around the periphery of said reel;
(2) means for allowing rotation of said reel in a second direction to unwind said fiber optic element from around the periphery of said reel against said means for biasing; and
(3) releasable retaining means between said hub and said reel for releasably retaining said reel at one of a plurality of locations with respect to said hub in opposition to said means for biasing, said releasable retaining means being engageable and releasable by applying and releasing tension along said fiber optic element.

2. A task light assembly according to claim 1 wherein said generally cylindrical periphery of said reel has a diameter of at least 18 inches or 45.7 cm.

3. A task light assembly according to claim 1 wherein said means for supporting supports said light source and said light inlet end of said fiber optic element on said reel, and said light source is an incandescent or halogen light bulb operated at a voltage of 48 volts or less and a power of at least 50 watts.

4. A task light assembly according to claim 1 wherein said means for supporting supports said light source and said light inlet end of said fiber optic element on said reel, and said light source is an incandescent or halogen light bulb operated at a voltage of 24 volts or less and a power of at least 250 watts.

5. A task light assembly according to claim 1 wherein said means for supporting supports said light source and said light inlet end of said fiber optic element on said reel, and a source of power for said light source is fed through a slip ring assembly mounted on said hub.

6. A task light assembly according to claim 1 wherein said means for supporting supports said light source along the outer surface of a flange for said reel, said reel has openings through which extend a portion of said fiber optic element adjacent said light inlet end from an innermost wrap of said fiber optic element around said peripheral surface to a position along the outer surface of said flange of said reel, and said task light assembly includes connector means for releasably connecting the light inlet end of said fiber optic element on said reel at a predetermined position with respect to said light source.

7. A task light assembly according to claim 6 wherein said means for supporting includes a housing fixed along the outer surface of said flange for said reel, said light source is mounted in said housing, and said connector means for releasably connecting the light inlet end of said fiber optic element on said reel at a predetermined position with respect to said light source includes a portion of said connector means mounted on said housing, and a portion of said connector means mounted on said fiber optic element adjacent said light inlet end.

8. A task light assembly according to claim 1 wherein said fiber optic element has a diameter in the range of about 10 to 14 mm.

9. A task light assembly according to claim 1 wherein said fiber optic element has a length of at least about 15 feet or 4.5 meters.

10. A task light assembly according to claim 1 further including means at the light outlet end of said fiber optic element for distributing light from the fiber optic element in a predetermined pattern.

* * * * *